(12) United States Patent
Yang et al.

(10) Patent No.: US 9,541,764 B2
(45) Date of Patent: Jan. 10, 2017

(54) FUNCTIONAL MATERIAL AND METHOD FOR PREPARING THE SAME, THREE-DIMENSIONAL DISPLAY RASTER AND DISPLAY DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Jiuxia Yang, Beijing (CN); Feng Bai, Beijing (CN); Hongbo Feng, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 14/769,281

(22) PCT Filed: Nov. 21, 2014

(86) PCT No.: PCT/CN2014/091831
§ 371 (c)(1),
(2) Date: Aug. 20, 2015

(87) PCT Pub. No.: WO2016/015406
PCT Pub. Date: Feb. 4, 2016

(65) Prior Publication Data
US 2016/0266395 A1    Sep. 15, 2016

(30) Foreign Application Priority Data
Jul. 29, 2014  (CN) .......................... 2014 1 0367829

(51) Int. Cl.
*G02B 27/22* (2006.01)
*C09K 11/67* (2006.01)
(Continued)

(52) U.S. Cl.
CPC ......... *G02B 27/2214* (2013.01); *C09K 11/592* (2013.01); *C09K 11/643* (2013.01);
(Continued)

(58) Field of Classification Search
CPC ... G02B 27/22; G02B 27/2214; C09K 11/592; C09K 11/643; C09K 11/646; C09K 11/676; C09K 11/678
(Continued)

(56) References Cited

U.S. PATENT DOCUMENTS

| 4,759,987 A | 7/1988 | Mizobe et al. |
| 6,540,825 B1 | 4/2003 | Quinn et al. |

(Continued)

FOREIGN PATENT DOCUMENTS

| CN | 1656148 A | 8/2005 |
| CN | 1718614 A | 1/2006 |

(Continued)

OTHER PUBLICATIONS

Fan Yong, et al; "Synthesis and Characterization of Polyimide/Alumina Nano-hybrid Film", China Academic Journal Electronic Publishing House, Feb. 2007, pp. 1-3; 6.
(Continued)

*Primary Examiner* — Bumsuk Won
*Assistant Examiner* — William R Alexander
(74) *Attorney, Agent, or Firm* — Ladas & Parry LLP

(57) ABSTRACT

The present invention provides a functional material, its preparation method, a three-dimensional display raster and a display device, which belongs to the display technical field and can solve the pollution problem in current three-dimen-
(Continued)

sional display devices. The functional material includes an inorganic mixed powder with a modified layer, the inorganic mixed powder comprising boron oxide, sodium oxide, lithium oxide, zirconium oxide, aluminum oxide, zinc oxide, titanium oxide, silicon dioxide, calcium oxide, silver complexes, silver phosphate, silver nitrate, tourmaline, silver thiosulfate, carbon nanotubes, aluminum sulfate, manganese, manganese oxide, iron, iron oxide, cobalt, cobalt oxide, nickel, nickel oxide, chromium, chromium oxide, copper, copper oxide, magnesium oxide, boron carbide, silicon carbide, titanium carbide, zirconium carbide, tantalum carbide, molybdenum carbide, boron nitride, chromium nitride, titanium nitride, zirconium nitride, aluminum nitride, chromium boride, $Cr_3B_4$, titanium boride, zirconium boride, tungsten disilicide, titanium disilicide and the like; the modified layer being generated by a reaction of a dianhydride and a diamine.

20 Claims, 3 Drawing Sheets

(51) Int. Cl.
    *C09K 11/59*     (2006.01)
    *C09K 11/64*     (2006.01)
(52) U.S. Cl.
    CPC .......... *C09K 11/646* (2013.01); *C09K 11/676* (2013.01); *C09K 11/678* (2013.01); *G02B 27/22* (2013.01)
(58) Field of Classification Search
    USPC .................................. 359/462, 464; 345/419
    See application file for complete search history.

(56) References Cited

U.S. PATENT DOCUMENTS

| | | | |
|---|---|---|---|
| 2010/0003507 A1 | 1/2010 | Wu et al. | |
| 2013/0048967 A1* | 2/2013 | Nishido | H05B 33/04 257/40 |
| 2013/0134397 A1* | 5/2013 | Yamazaki | H01L 51/52 257/40 |
| 2013/0134398 A1* | 5/2013 | Yamazaki | B32B 17/00 257/40 |
| 2015/0331315 A1* | 11/2015 | Yang | C08L 75/16 430/281.1 |

FOREIGN PATENT DOCUMENTS

| | | |
|---|---|---|
| CN | 100999589 A | 7/2007 |
| CN | 101225208 A | 7/2008 |
| CN | 101260235 A | 9/2008 |
| CN | 101343425 A | 1/2009 |
| CN | 101426338 A | 5/2009 |
| CN | 101805517 A | 8/2010 |
| CN | 102039100 A | 5/2011 |
| CN | 103555003 A | 2/2014 |
| CN | 103739205 A | 4/2014 |
| JP | 2004-341380 A | 12/2004 |
| JP | 2004-341381 A | 12/2004 |
| JP | 2005-029584 A | 2/2005 |
| TW | 201002761 A | 1/2010 |

OTHER PUBLICATIONS

First Chinese Office Action Appln. No. 201410367829.5; Dated Jul. 14, 2015.
International Search Report and Written Opinion Appln. No. PCT/CN2014/091831; Dated May 6, 2015.

* cited by examiner

FUNCTIONAL MATERIAL AND METHOD FOR PREPARING THE SAME, THREE-DIMENSIONAL DISPLAY RASTER AND DISPLAY DEVICE

TECHNICAL FIELD

The present invention relates to the display technical field, in particular to a functional material and a method for preparing the same, as well as a three-dimensional display raster and a display device.

BACKGROUND

Naked eye three-dimensional display is a type of three-dimensional display (3D display), and refers to a technology in which users can obtain three-dimensional display effects without the need to wear polarized glasses.

As shown in FIG. 1, the core of naked eye three-dimensional display technology is a three-dimensional display raster 2 having a shade strip and a transparent strip which are alternately arranged. When the three-dimensional display raster 2 is provided at a specific position outside the light-exiting surface of a display panel 1 (such as a liquid crystal display panel, an organic light-emitting diode display panel, etc.), due to the light barrier effect of the shade strip, the left eye of a user can only see one region of the display panel 1 and the right eye can only see the other region of the display panel 1. As such, the three-dimensional display effect can be achieved as long as the two regions of the display panel 1 respectively have a display visible to the left eye and the right eye.

Nonetheless, the display panel of a three-dimensional display device will inevitably produce some electromagnetic radiation pollution during use, which will affect human health.

SUMMARY OF THE INVENTION

Regarding the problem that current three-dimensional display devices will produce pollution, the present invention provides an environmentally friendly functional material which can play a role in heath care and a method for preparing the same, as well as a three-dimensional display raster and a display device.

One technical solution employed to address a technical problem of the present invention is a functional material comprising an inorganic mixed powder whose surface has a modified layer, the inorganic mixed powder comprising a primary ingredient and a secondary ingredient;

the primary ingredient consisting of boron oxide, sodium oxide, lithium oxide, and zirconium oxide;

the secondary ingredient including any one or more of aluminum oxide, zinc oxide, titanium dioxide, silicon dioxide, calcium oxide, silver complexes, silver phosphate, silver nitrate, tourmaline, silver thiosulfate, carbon nanotubes, aluminum sulfate, manganese, manganese oxide, iron, iron oxide, cobalt, cobalt oxide, nickel, nickel oxide, chromium, chromium oxide, copper, copper oxide, magnesium oxide, boron carbide, silicon carbide, titanium carbide, zirconium carbide, tantalum carbide, molybdenum carbide, boron nitride, chromium nitride, titanium nitride, zirconium nitride, aluminum nitride, chromium boride, $Cr_3B_4$, titanium boride, zirconium boride, tungsten disilicide, and titanium disilicide; and the modified layer being generated by a reaction of a dianhydride and a diamine.

For example, the molar ratio of the dianhydride to the diamine for generating the modified layer is between 0.85:1 and 1.05:1.

More preferably, the molar ratio of the dianhydride to the diamine for generating the modified layer is between 0.92:1 and 1.05:1.

For example, the dianhydride for generating the modified layer comprises at least one phenyl group, and the diamine for generating the modified layer comprises at least one phenyl ring or at least one non-phenyl six-membered carbocyclic ring.

More preferably, the dianhydride for generating the modified layer is selected from any one of pyromellitic dianhydride, trimellitic anhydride, benzophenone dianhydride, biphenyl dianhydride, diphenyl ether dianhydride, and 4,4'-(hexafluoroisopropylidene) diphthalic anhydride; the diamine for generating the modified layer is selected from any one of 3-amino-benzylamine, 2,2'-difluoro-4,4'-(9-fluorenylidene) dianiline, 2,2-bis(3-amino-4-hydroxyphenyl) hexafluoropropane, hexahydro-m-xylylene diamine, 1,4-bis (aminomethyl)cyclohexane, 2,2-bis[4-(4-aminophenoxy) phenyl]hexafluoropropane, 2,2-bis(3-amino-4-methylphenyl) hexafluoropropane, 2,2-bis(3-aminophenyl) hexafluoropropane, 2,2-bis(4-aminophenyl) hexafluoropropane, 2,7-diamino-fluorene, m-xylylene diamine, and 4,4'-methylene bis(2-ethyl-6-methylaniline).

For example, the inorganic mixed powder has a particle diameter of 1 to 5000 nm.

One technical solution employed to solve a technical problem of the present invention is a method for preparing the above functional material, comprising:

mixing the inorganic mixed powder, the dianhydride, and the diamine with an initiator and a solvent uniformly; and reacting the dianhydride with the diamine by heating to form the modified layer on the surface of the inorganic mixed powder.

For example, the mass ratio of the inorganic mixed powder to the substance generated by the reaction of the dianhydride and the diamine is between 20:1 and 1:1.

More preferably, the initiator is any one of azo bisisobutyronitrile, 2,2'-azo-bis-(2,4-dimethylvaleronitrile), dimethyl azobisisobutyrate and azo bisisovaleronitrile.

For example, the heating comprises two steps: heating at a temperature of 35 to 70° C. for 20 to 40 min; and heating at a temperature of 70 to 100° C. for 20 to 40 min.

One technical solution employed to solve a technical problem of the present invention is a three-dimensional display raster comprising a raster body comprising a shade strip and a transparent strip which are alternately arranged, wherein the surface and/or interior of the raster body comprise(s) the above functional material.

For example, the interior of the raster body comprises the functional material in an amount of 0.1 to 30% by mass; and/or, the surface of the raster body has a surface film layer with a thickness of 50 to 1000 nm which comprises the functional material in an amount of 0.1 to 10% by mass.

More preferably, the interior of the raster body comprises the functional material in an amount of 3 to 20% by mass; and/or, the surface film layer comprises the functional material in an amount of 0.5 to 5% by mass.

One technical solution employed to solve a technical problem of the present invention is a three-dimensional display device comprising a display panel and the above three-dimensional display raster.

Functional materials of the present invention can emit far-infrared light and negative ions. Far-infrared light, after being absorbed by a human body, can allow water molecules in the body to resonate and be activated, which enhances the intermolecular bonding force, thereby activating proteins and other biological macromolecules and bringing the organism cells to the highest vibration level. Furthermore, far-infrared heat can be transferred to a subcutaneous deeper part, thus increasing the temperature of the subcutaneous deeper part, expanding the capillaries, promoting the blood circulation, strengthening the metabolism among tissues, promoting a tissue regeneration capacity, enhancing the organism immunity, and bringing the vivacity. On the other hand, negative ions can decompose and oxidize bacteria and organic substances, and may serve the function of disinfection and sterilization and produce the effect of improving air quality. Therefore, the functional material may play a role in health care and is environmentally friendly.

The surface of the inorganic mixed powder in the functional material according to the present invention has a modified layer, which can allow the inorganic mixed powder to bond well with the raster body and can further improve the inorganic mixed powder's capacity to emit far-infrared light and negative ions, so that the functional material is well incorporated into the three-dimensional display raster to increase its environmental friendliness without affecting the performance of the three-dimensional display raster itself.

Figure 1:
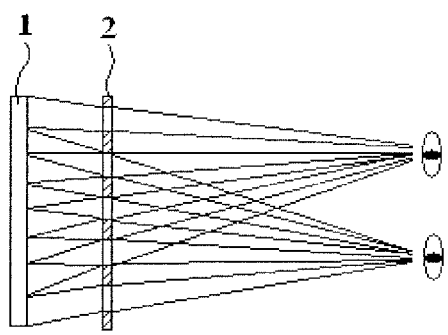
FIG. 1 is a schematic diagram of the principle of a current three-dimensional display device.

wherein the reference signs are:
1. a display panel; 2. a three-dimensional display raster; 21. a raster body; 3. a functional material; 22. a surface film layer.

DETAILED DESCRIPTION

To enable those skilled in the art to better understand the technical solution of the present invention, further detailed descriptions are made for the present invention with reference to the drawings and embodiments.

The present embodiment provides a functional material and a method for preparing the same.

The functional material comprises an inorganic mixed powder having a modified layer on its surface, the inorganic mixed powder comprising a primary ingredient and a secondary ingredient;

the primary ingredient consisting of boron oxide, sodium oxide, lithium oxide, and zirconium oxide;

the secondary ingredient including any one or more of aluminum oxide, zinc oxide, titanium oxide, silicon dioxide, calcium oxide, silver complexes, silver phosphate, silver nitrate, tourmaline, silver thiosulfate, carbon nanotubes, aluminum sulfate, manganese, manganese oxide, iron, iron oxide, cobalt, cobalt oxide, nickel, nickel oxide, chromium, chromium oxide, copper, copper oxide, magnesium oxide, boron carbide, silicon carbide, titanium carbide, zirconium carbide, tantalum carbide, molybdenum carbide, boron nitride, chromium nitride, titanium nitride, zirconium nitride, aluminum nitride, chromium boride, $Cr_3B_4$, titanium boride, zirconium boride, tungsten disilicide, and titanium disilicide; and the modified layer being generated by reaction of a dianhydride and a diamine.

The particle diameter of the inorganic mixed powder is from nanometers to micrometers, specifically, for example, from 1 to 5000 nm, preferably from 10 to 500 nm. The particle diameter can be measured, for example, by a Malvern laser particle size analyzer.

Dianhydride refers to a substance containing at least two anhydride groups in the molecular structure; while diamine refers to a substance containing at least two amine groups (or amino groups) in the molecular structure.

The dianhydride, for example, contains at least one phenyl group, and is preferably any one of pyromellitic dianhydride, trimellitic anhydride, benzophenone dianhydride, biphenyl dianhydride, diphenyl ether dianhydride, and 4,4'-(Hexafluoroisopropylidene)diphthalic anhydride.

The diamine, for example, contains at least one phenyl ring or at least one non-phenyl six-membered carbocyclic ring (e.g. cyclohexane), preferably any one of 3-aminobenzylamine, 2,2'-difluoro-4,4'-(9-fluorenyl idene) dianiline, 2,2-bis(3-amino-4-hydroxyphenyl) hexafluoropropane, hexahydro-m-xylylene diamine, 1,4-bis(aminomethyl) cyclohexane, 2,2-bis[4-(4-aminophenoxy)phenyl]hexafluoropropane, 2,2-bis(3-amino-4-methylphenyl) hexafluoropropane, 2,2-bis(3-aminophenyl) hexafluoropropane, 2,2-bis(4-aminophenyl) hexafluoropropane, 2,7-diaminofluorene, m-xylylene diamine, and 4,4'-methylene bis(2-ethyl-6-methylaniline).

The molar ratio of the dianhydride to the diamine is from 0.85:1 to 1.05:1, preferably from 0.92:1 to 1.05:1.

Our studies have revealed that the modified layer generated by reaction of the above dianhydride and diamine can desirably improve the properties of the inorganic mixed powder.

Functional materials of the present embodiment can emit far-infrared light and negative ions. Far-infrared light, after being absorbed by a human body, can allow water molecules in the body to resonate and be activated, which enhances the intermolecular bonding force, thereby activating proteins and other biological macromolecules and bringing the organism cells to the highest vibration level. Furthermore, far-infrared heat can be transferred to a subcutaneous deeper part, thus increasing the temperature of the subcutaneous deeper part, expanding the capillaries, promoting the blood circulation, strengthening the metabolism among tissues, promoting a tissue regeneration capacity, enhancing the organism immunity, and bringing the vivacity. On the other hand, negative ions can decompose and oxidize bacteria and organic substances, and may serve the function of disinfection and sterilization and produce the effect of improving air quality. Therefore, the functional material may play a role in health care and is environmentally friendly.

The method for preparing the above functional material comprises: mixing the inorganic mixed powder, the dianhydride, and the diamine with an initiator and a solvent uniformly; and reacting the dianhydride with the diamine by heating to form the modified layer on the surface of the inorganic mixed powder.

Figure 2:
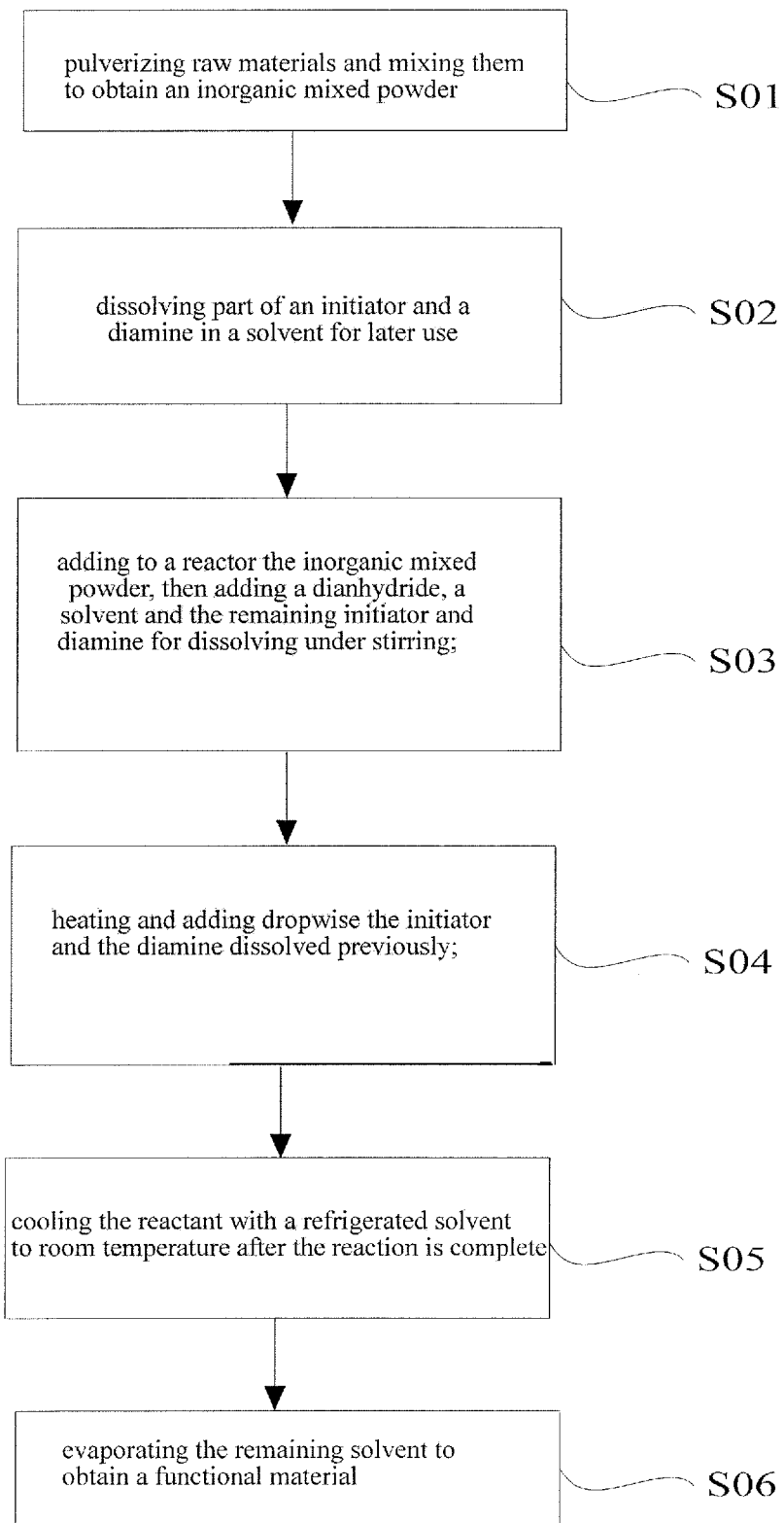
FIG. 2 is a flow chart of a method for preparing a functional material according to an embodiment of the present invention.

To be specific, as shown in FIG. 2, the above preparation method may comprise:

S01, in the case of using a dispersant, pulverizing the raw materials respectively into powder and mixing the same uniformly in proportion, or mixing the raw materials in proportion uniformly and then pulverizing the same, to yield an inorganic mixed powder;

wherein the dispersant may be chosen from conventional dispersants such as BYK 161 manufactured by BYK Additives & Instruments and Solsperse 32500 and Solsperse 22000 manufactured by The Lubrizol Corporation; pulverization may be carried out using conventional methods such as ball milling, grinding, and the like; as the inorganic mixed powder may be prepared by existing methods, no further details will be provided herein.

S02, dissolving from a fourth to a third of an initiator and from a fourth to a third of a diamine in a solvent for later use.

The mass ratio of the inorganic mixed powder to the substance generated by the reaction of the dianhydride and the diamine is from 20:1 to 1:1.

That is to say, the amounts of the dianhydride and the diamine are determined as follows: assuming a complete reaction between the dianhydride and the diamine to yield a resultant (which is actually a modified layer), if the mass of the resultant is 1, then the mass of the inorganic mixed powder is between 1 and 20; such an amount can ensure that a modifier layer with a suitable thickness can be obtained on the inorganic mixed powder.

An initiator is used to initiate the reaction, which, for example, is a nitrogen-based initiator, preferably any one of azo bisisobutyronitrile, 2,2'-azo bis(2,4-dimethylvaleronitrile), dimethyl azo bisisobutyrate, and azo bisisovaleronitrile.

The solvent can be selected from fatty alcohols, glycol ethers, ethyl acetate, methyl ethyl ketone, methyl isobutyl ketone, ethylene glycol monomethyl ether, γ-butyrolactone, ethyl 3-ethoxypropionate, butyl carbitol, butyl carbitol acetate, propylene glycol monomethyl ether, propylene glycol monomethyl ether acetate, cyclohexane, xylene, isopropanol, and other conventional organic solvents. Since the choice of the solvent has no significant effect on the performance of the final product, propylene glycol monomethyl ether acetate is used in all the Examples as the solvent.

S03, adding the inorganic mixed powder to a reaction vessel (e.g., a four-neck flask) which is then subjected to stirring, shocking, shaking and the like; afterwards, adding the dianhydride and the solvent as well as the remaining initiator and diamine and allowing them to be dissolved uniformly.

S04, heating to carry out the reaction for example in two steps, specifically comprising: heating at a temperature of 35 to 70° C. for 20 to 40 min; and then continuing heating at a temperature of 70 to 100° C. for 20 to 40 min.

During the above heating process, the dianhydride and the diamine are allowed to react, thereby generating a modified layer on the surface of the inorganic mixed powder; wherein heating is carried out in two steps so as to prevent the reaction from being too severe.

During the reaction process, the above solution prepared by dissolving an initiator and a diamine is gradually added dropwise to a four-neck flask so as to prevent the reaction from being too severe.

The reaction in this step may be carried out, for example, under the protection of nitrogen, and for example under constant stirring.

The solvent in each step is in an amount sufficient to disperse and dissolve the substances therein uniformly, while the initiator is in an amount sufficient to initiate the reaction, which can be adjusted by those skilled in the art based on the actual conditions, and thus no further detail is given herein. However, the mass ratio (all referring to the total amount) of the inorganic mixed powder, the initiator and the solvent is generally 1:(from 0.25 to 0.4):(from 1 to 1.5). To achieve consistency in the process of preparing the functional material in the various Examples, the mass ratio of the inorganic powder, the initiator and the solvent is 1:0.3:1.4.

S05, cooling the reactant with a refrigerated solvent to room temperature (at about 10 to 30° C.) after the reaction is complete.

S06, evaporating the remaining solvent or separating the powder therefrom, to yield an inorganic mixed powder with a modified layer, i.e., a functional material.

Of course, it should be appreciated that the preparation method described above may undergo a number of variations, e.g., the dianhydride, the diamine, and the initiator can be dissolved once in the solvent; for another example, heating can be carried out in one step. After all, any variation is allowed as long as the dianhydride and the diamine can react to form a modified layer on the surface of the inorganic mixed powder.

The infrared emissivity of the functional material is measured according to the GB/T 7287-2008 standard test, and the amount of anions generated by the functional material is measured using an air anion analyzer (for example, Japan KEC Corporation's KEC-900 type).

Various functional materials were prepared according to the method described above, where the materials, amounts, parameters and product properties are shown in the following tables.

TABLE 1

Information about the primary ingredient in the inorganic mixed powder of the functional materials in Examples (content unit: by mass parts)

| Example # | Content of Boron Oxide | Content of Sodium Oxide | Content of Lithium Oxide | Content of Zirconium Oxide |
|---|---|---|---|---|
| 1 | 3.83 | 1.83 | 6.73 | 20 |
| 2 | 5.18 | 2.27 | 8.16 | 25 |
| 3 | 6.5 | 3.6 | 10.5 | 30 |
| 4 | 7.17 | 3.6 | 10.5 | 30 |

TABLE 2

Information about the secondary ingredient in the inorganic mixed powder of the functional materials in Examples (content unit: by mass parts)

| Example # | Secondary Ingredient 1 Type | Secondary Ingredient 1 Content | Secondary Ingredient 2 Type | Secondary Ingredient 2 Content | Secondary Ingredient 3 Type | Secondary Ingredient 3 Content |
|---|---|---|---|---|---|---|
| 1 | Silicon Dioxide | 40 | Manganese Oxide | 1.2 | Calcium Oxide | 0.98 |
| 2 | Silicon Dioxide | 40 | Aluminum Nitride | 15 | Silver Phosphate | 3 |

TABLE 2-continued

Information about the secondary ingredient in the inorganic mixed powder of the functional materials in Examples (content unit: by mass parts)

| Example # | Secondary Ingredient 1 Type | Secondary Ingredient 1 Content | Secondary Ingredient 2 Type | Secondary Ingredient 2 Content | Secondary Ingredient 3 Type | Secondary Ingredient 3 Content |
|---|---|---|---|---|---|---|
| 3 | Silicon Dioxide | 40 | Nickel Oxide | 1.4 | Chromic Oxide | 1.4 |
| 4 | Alumina | 10 | Magnesium Oxide | 10 | None | None |

TABLE 3

Information about raw materials for preparing a modified layer in the functional materials of Examples

| Example # | Dianhydride Type | Diamine Type | Mass Ratio of Dianhydride to Diamine | Mass Ratio of Inorganic Mixed Powder to Resultant | Initiator Type |
|---|---|---|---|---|---|
| 1 | Benzophenone Dianhydride | 1,4-bis(aminomethyl)cyclohexane | 0.85:1 | 20:1 | Azobisisovaleronitrile |
| 2 | Biphenyl Dianhydride | 3-amino-benzylamine | 0.92:1 | 1:1 | Azobisisovaleronitrile |
| 3 | 4,4'-(Hexafluoroisopropylidene)-diphthalic anhydride | Hexahydro-m-xylylene diamine | 1:1 | 12:1 | Azobisisobutyronitrile |
| 4 | Pyromellitic Dianhydride | 2,7-diamino-fluorene | 1.05:1 | 15:1 | 2,2'-azobis(2,4-dimethylvaleronitrile) |

TABLE 4

Preparation parameters and performance testing results of the functional materials in Examples

| Example # | Heating temperature at the first stage (° C.) | Heating duration at the first stage (min) | Heating temperature at the second stage (° C.) | Heating duration at the second stage (min) | Infrared emissivity (%) | Anion concentration (per cubic centimeter) |
|---|---|---|---|---|---|---|
| 1 | 35 | 40 | 70 | 40 | 85 | 2572 |
| 2 | 70 | 20 | 100 | 20 | 88 | 2466 |
| 3 | 45 | 35 | 80 | 35 | 92 | 2785 |
| 4 | 55 | 25 | 90 | 25 | 94 | 2810 |

As can be seen from the above, all the functional materials of the Examples have a high infrared emissivity and a high anion concentration, which indicates that they actually can produce far-infrared light and anions, thereby improving the environment.

Figure 3:
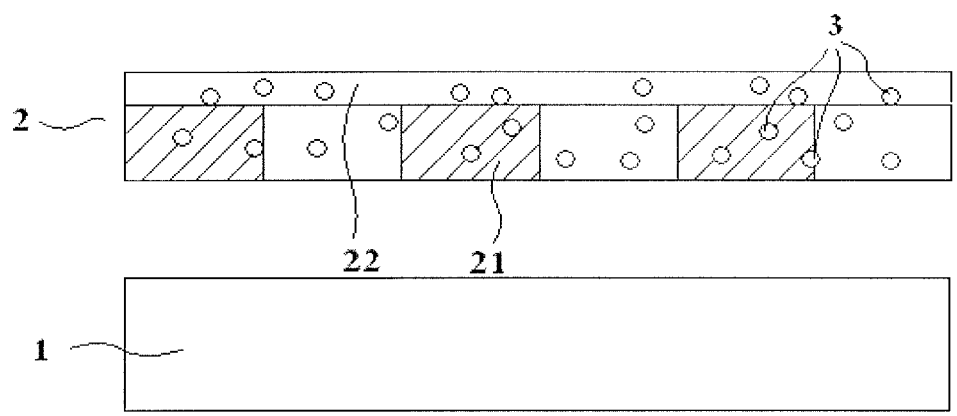
FIG. 3 is a schematic cross-sectional structure of a three-dimensional display device according to an embodiment of the present invention.

As shown in FIG. 3, an embodiment of the present invention further provides a three-dimensional display raster 2 and a three-dimensional display device; wherein the three-dimensional display raster 2 comprises a raster body 21 which is plate-like, and the raster body 21 comprises a shade strip and a transparent strip which are alternately arranged, and can serve as light barrier so as to achieve three-dimensional display.

The above functional material 3 is provided in the interior of the raster body 21 and/or on the surface of the raster body 21.

In another word, the above functional material 3 is applied to the interior and/or surface of the raster body 21 so as to improve the environmental friendliness of the three-dimensional display raster 2.

For example, the mass percentage of the functional material 3 in the interior of the raster body 21 is 3 to 20%; and/or, the surface of the raster body 21 has a surface film layer 22 with a thickness of 50 to 1000 nm which contains the functional material 3, wherein the mass percentage of the functional material 3 in the surface film layer 22 is 0.1 to 10%.

In other words, the functional material 3 can be directly incorporated into the raster body 21. Specifically, the functional material 3 can be added to the materials (e.g., polyethylene terephthalate particles, polyvinyl alcohol particles) for preparing the raster body 21. As such, in the process of heating and melting these materials to form the raster body 21, the functional material 3 will naturally be formed inside the raster body 21 directly and its mass percentage (based on the total mass 100% of the raster body 21 and the functional material 3) is, for example, 0.1 to 30%, preferably 3 to 20%.

Alternatively, the functional material 3 is distributed in a surface film layer 22 provided on the surface of the raster body 21. Specifically, the functional material 3 can be dispersed in a solvent to form a suspension, which is then applied to the surface of the raster body 21 by means of coating, spraying and the like. After curing, a surface film layer 22 having a thickness of 50 to 1000 nm is formed on the surface of the raster body 21, wherein the mass percentage (based on the total mass 100% of the surface film layer 22 and the functional material 3) of the functional material 3 is, for example, 0.1 to 10%, preferably 0.5 to 5%.

Apparently, while the functional material 3 is environmentally beneficial, if an excessive amount thereof is used, then the properties of the raster 2 itself will be affected. Our study reveals that the functional material 3 within the above content range is environmentally beneficial without notably affecting the properties of the three-dimensional display raster 2 itself, and therefore is preferable.

By observing the three-dimensional display raster 2 of the present embodiment, it was found out that the functional material 3 therein did not involve any phenomenon such as agglomeration, shedding, etc., which suggests that the functional material 3 could be well bonded to the three-dimensional display raster 2.

The surface of the inorganic mixed powder in the functional material 3 of the present embodiment has a modified layer which can allow the inorganic mixed powder to bond well to a raster body 21 and can improve the inorganic mixed powder's capacity to emit far-infrared light and negative ions, so that the functional material 3 can be well incorporated into the three-dimensional display raster 2 to increase its environmental friendliness without affecting the performance of the three-dimensional display raster 2 itself.

The three-dimensional display device of the present embodiment comprises a display panel 1 and the above three-dimensional display raster 2 provided outside the light-exiting surface of the display panel 1.

It should be appreciated that the above embodiments are merely exemplary embodiments to illustrate the principles of the present invention, but the present invention is not limited thereto. Those of ordinary skill in the art, without departing from the spirit and essence of the present invention, may make various changes and improvements. Such changes and improvements are deemed within the scope of the invention.

The present application claims the priority of the Chinese Patent Application No. 201410367829.5 filed on Jul. 29, 2014, which is incorporated herein by reference as part of the present application.

What is claimed is:

1. A three-dimensional display raster comprising a raster body comprising a shade strip and a transparent strip which are alternately arranged, wherein the surface and/or interior of the raster body comprise(s) a functional material comprising an inorganic mixed powder whose surface has a modified layer, wherein the inorganic mixed powder comprises a primary ingredient and a secondary ingredient;
the primary ingredient consists of boron oxide, sodium oxide, lithium oxide, and zirconium oxide;
the secondary ingredient includes any one or more of aluminum oxide, zinc oxide, titanium dioxide, silicon dioxide, calcium oxide, silver complexes, silver phosphate, silver nitrate, tourmaline, silver thiosulfate, carbon nanotubes, aluminum sulfate, manganese, manganese oxide, iron, iron oxides, cobalt, cobalt oxide, nickel, nickel oxide, chromium, chromium oxide, copper, copper oxide, magnesium oxide, boron carbide, silicon carbide, titanium carbide, zirconium carbide, tantalum carbide, molybdenum carbide, boron nitride, chromium nitride, titanium nitride, zirconium nitride, aluminum nitride, chromium boride, $Cr_3B_4$, titanium boride, zirconium boride, tungsten disilicide, and titanium disilicide; and
the modified layer is generated by a reaction of a dianhydride and a diamine.

2. The three-dimensional display raster according to claim 1, wherein
the interior of the raster body comprises the functional material in an amount of 0.1 to 30% by mass; and/or
the surface of the raster body has a surface film layer with a thickness of 50 to 1000 nm which comprises the functional material in an amount of 0.1 to 10% by mass.

3. The three-dimensional display raster according to claim 2, wherein
the interior of the raster body comprises the functional material in an amount of 3 to 20% by mass; and/or
the surface film layer comprises the functional material in an amount of 0.5 to 5% by mass.

4. A three-dimensional display device comprising a display panel and a three-dimensional display raster, wherein the three-dimensional display raster is the three-dimensional display raster according to claim 1.

5. The three-dimensional display raster according to claim 1, wherein
the molar ratio of the dianhydride to the diamine for generating the modified layer is from 0.85:1 to 1.05:1.

6. The three-dimensional display raster according to claim 5, wherein
the molar ratio of the dianhydride to the diamine for generating the modified layer is from 0.92:1 to 1.05:1.

7. The three-dimensional display raster according to claim 1, wherein
the dianhydride for generating the modified layer contains at least one phenyl group; and
the diamine for generating the modified layer contains at least one phenyl ring or at least one non-phenyl six-membered carbocyclic ring.

8. The three-dimensional display raster according to claim 7, wherein
the dianhydride for generating the modified layer is selected from any one of pyromellitic dianhydride, trimellitic anhydride, benzophenone dianhydride, biphenyl dianhydride, diphenyl ether dianhydride, and 4,4'-(hexafluoroisopropylidene) diphthalic anhydride;
the diamine for generating the modified layer is selected from any one of 3-aminobenzylamine, 2,2'-difluoro-4,4'-(9-fluorenylidene) dianiline, 2,2-bis(3-amino-4-hydroxyphenyl) hexafluoropropane, hexahydro-m-xylylene diamine, 1,4-bis(aminomethyl) cyclohexane, 2,2-bis[4-(4-aminophenoxy)phenyl]hexafluoropropane, 2,2-bis(3-amino-4-methylphenyl) hexafluoropropane, 2,2-bis(3-aminophenyl) hexafluoropropane, 2,2-bis(4-aminophenyl) hexafluoropropane, 2,7-diaminofluorene, m-xylylene diamine, and 4,4'-methylene bis(2-ethyl-6-methylaniline).

9. The three-dimensional display raster according to claim 1, wherein the inorganic mixed powder has a particle diameter of 1 to 5000 nm.

10. The three-dimensional display raster according to claim 5, wherein
the interior of the raster body comprises the functional material in an amount of 0.1 to 30% by mass; and/or
the surface of the raster body has a surface film layer with a thickness of 50 to 1000 nm which comprises the functional material in an amount of 0.1 to 10% by mass.

11. The three-dimensional display raster according to claim 6, wherein the interior of the raster body comprises the functional material in an amount of 0.1 to 30% by mass; and/or the surface of the raster body has a surface film layer with a thickness of 50 to 1000 nm which comprises the functional material in an amount of 0.1 to 10% by mass.

12. The three-dimensional display raster according to claim 7, wherein the interior of the raster body comprises the functional material in an amount of 0.1 to 30% by mass; and/or the surface of the raster body has a surface film layer with a thickness of 50 to 1000 nm which comprises the functional material in an amount of 0.1 to 10% by mass.

13. The three-dimensional display raster according to claim 8, wherein the interior of the raster body comprises the functional material in an amount of 0.1 to 30% by mass; and/or the surface of the raster body has a surface film layer with a thickness of 50 to 1000 nm which comprises the functional material in an amount of 0.1 to 10% by mass.

14. The three-dimensional display raster according to claim 9, wherein the interior of the raster body comprises the functional material in an amount of 0.1 to 30% by mass; and/or the surface of the raster body has a surface film layer with a thickness of 50 to 1000 nm which comprises the functional material in an amount of 0.1 to 10% by mass.

15. The three-dimensional display raster according to claim 10, wherein the interior of the raster body comprises the functional material in an amount of 3 to 20% by mass; and/or the surface film layer comprises the functional material in an amount of 0.5 to 5% by mass.

16. The three-dimensional display raster according to claim 11, wherein the interior of the raster body comprises the functional material in an amount of 3 to 20% by mass; and/or the surface film layer comprises the functional material in an amount of 0.5 to 5% by mass.

17. The three-dimensional display raster according to claim 12, wherein the interior of the raster body comprises the functional material in an amount of 3 to 20% by mass; and/or the surface film layer comprises the functional material in an amount of 0.5 to 5% by mass.

18. The three-dimensional display raster according to claim 13, wherein the interior of the raster body comprises the functional material in an amount of 3 to 20% by mass; and/or the surface film layer comprises the functional material in an amount of 0.5 to 5% by mass.

19. The three-dimensional display raster according to claim 14, wherein the interior of the raster body comprises the functional material in an amount of 3 to 20% by mass; and/or the surface film layer comprises the functional material in an amount of 0.5 to 5% by mass.

20. A three-dimensional display device comprising a display panel and a three-dimensional display raster, wherein the three-dimensional display raster is the three-dimensional display raster according to claim 2.

* * * * *